United States Patent [19]
Blatt et al.

[11] Patent Number: 5,152,566
[45] Date of Patent: Oct. 6, 1992

[54] SPREADER ARM MOUNTING DEVICE

[75] Inventors: John A. Blatt, 22 Stratton Pl., Grosse Pointe Shores, Mich. 48236; David C. Tomlin, Mt. Clemens, Mich.

[73] Assignee: John A. Blatt, Grosse Pointe Shores, Mich.

[21] Appl. No.: 640,140

[22] Filed: Jan. 11, 1991

Related U.S. Application Data

[63] Continuation-in-part of Ser. No. 639,831, Jan. 9, 1991.

[51] Int. Cl.$^5$ .............................................. B66C 1/00
[52] U.S. Cl. ...................................... 294/81.2; 294/65
[58] Field of Search ............... 294/81.1, 81.2, 81.3, 294/81.4, 81.54, 81.6, 65

[56] References Cited

U.S. PATENT DOCUMENTS

| | | | |
|---|---|---|---|
| 1,110,409 | 9/1914 | Sutherland, Jr. | 294/65 |
| 1,801,305 | 4/1931 | Drake | 294/65 |
| 3,318,068 | 5/1967 | Voullaire | 53/164 |
| 3,542,412 | 11/1970 | Koch et al. | 294/65 |
| 3,724,891 | 4/1973 | Brickley | 294/81.4 |
| 3,885,678 | 5/1975 | Borg | 214/1 BB |
| 4,650,234 | 3/1987 | Blatt | 294/65 |
| 4,685,714 | 8/1987 | Hoke | 294/81.2 |

OTHER PUBLICATIONS cpi-Engineered End Arm Tooling Systems for stamping and assembly operations (brochure).
cpi-Automation Komponenten (drawing).

*Primary Examiner*—Margaret A. Focarino
*Assistant Examiner*—Dean J. Kramer
*Attorney, Agent, or Firm*—Basile and Hanlon

[57] ABSTRACT

Various forms of mounting devices for mounting workpiece gripper carrying spreader bars upon a boom of a transfer device are disclosed. The boom is formed within an undercut T slot which extends the length of the boom and slidably receives a retainer member. A base spans the slot and is clamped to the side of the boom by clamping screws threadably received in the retainer member so that the base and retainer can be fixedly clamped to the boom at any selected location longitudinally of the boom. A recessed clamp member cooperatively defines within a recess in the base the socket of a ball and socket joint. In one form of the device, the same clamping screws which clamp the base to the boom simultaneously clamp a spherical coupling member fixed to a spreader bar and received in the socket in a selected fixed angularly adjusted position between the clamp member and base. In another form of device one set of clamping screws clamps the base and retainer to the boom and a second set of clamping screws are engaged between the clamp member and base. The coupling member may take the form of an annular split ring resiliently clamped to the spreader bar or may take the form of a spherical enlargement formed on the spreader bar.

18 Claims, 3 Drawing Sheets

SPREADER ARM MOUNTING DEVICE

REFERENCE TO RELATED APPLICATION

This application is a continuation-in-part of my co-pending application Ser. No. 07/639,831, filed Jan. 9, 1991 for TRANSFER BOOM.

BACKGROUND OF THE INVENTION

The present invention is directed to transfer boom assemblies of the general type disclosed in U.S. Pat. No. 4,650,234 in which a plurality of workpiece engaging devices, such as vacuum cups, clamps or grippers are supported from an elongate rigid boom by spreader bars mounted at one end upon the boom and secured at its opposite end to the vacuum cup or gripper. The workpiece engaging devices—i.e. vacuum cups or grippers are positioned relative to each other and to the boom to releasably grip a workpiece such as an automotive body panel to be transferred from one work station to another by movement of the boom.

My parent application Ser. No. 07/639,831 referred to above discloses an improved boom construction in which an extruded boom is formed with an undercut T slot and air passages extending the length of the boom so that a spreader bar may be clamped to the boom by means of the T slot at any selected location along the boom, and air under pressure supplied to a pressure actuated workpiece gripping device at the end of the spreader arm by tapping into the air passage on the boom and running a pneumatic conduct along the spreader arm to the pneumatically actuated workpiece gripper.

The present invention is directed to various forms of mounting devices for mounting the spreader bar upon the boom by utilizing the T slot in the boom to clamp the mounting device in position longitudinally of the boom while providing a capability for angularly adjusting the spreader bar relative to the boom about any or all of three mutually perpendicular axes.

SUMMARY OF THE INVENTION

Mounting devices embodying the present invention include a base, a retainer element conformed to be slidably received within a T slot in the boom, and a clamping member. The clamping member is disposed in face to face relationship with one side surface of the base, and the opposed faces of the base and clamping member are formed with like doubly concave recesses which cooperatively constitute the socket portion of a ball and socket joint. Clamping screws are employed to clamp a spherical coupling element within the recesses between the clamp member and base and to clamp the retainer and base to the boom.

The coupling member in one form is constituted by an annular ring having a central bore for receiving the spreader bar. The ring is slotted along one side so that the bar can be resiliently gripped within the bore of the ring. The outer surface of the ring is a convex spherical surface matched to the recesses in the base and clamp member. In an alternative form of the invention, the spreader bar may take the form of a hollow tubular member formed with a spherical enlargement at one end dimensioned to be gripped within the concave recesses of the base and clamp member.

In one form of the invention, the base is formed with parallel opposite side surfaces, one of which is in face to face engagement with the side of the boom at opposite sides of the T slot. The parallel opposite side surface of the base is the side which is opposed to the clamp member and formed with the concave recess. In this embodiment, clamping screws having heads seated in the clamp member pass freely through aligned bores in the clamp member and base and are threaded into tapped bores in the retainer so that tightening of the clamping screws simultaneously clamps the coupling element in the ball and socket joint between the clamp member and base and also clamps the base and retainer to the boom.

In another form of the invention, one set of clamping screws is employed to clamp the base and retainer to the boom, while the clamp member is opposed to a surface of the base which is not necessarily parallel to that surface of the base which is engaged with the boom. In this embodiment, a second set of clamping screws seated in the clamp member and threadably received in the base is employed to clamp the ball and socket joint of the assembly.

Other objects and features of the invention will become apparent by reference to the following specification and to the drawings.

IN THE DRAWINGS

DETAILED DESCRIPTION OF THE PREFERRED EMBODIMENTS

Figure 1:
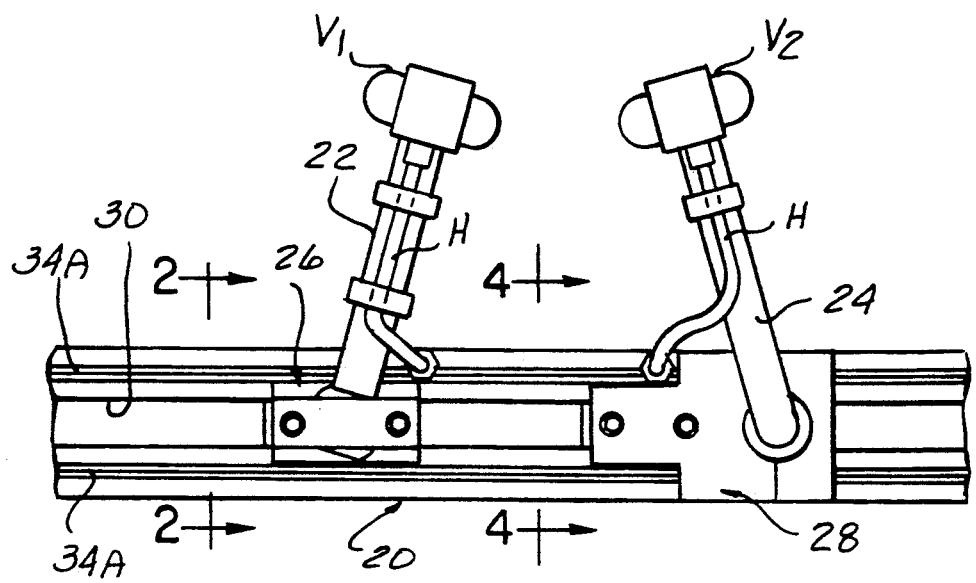
FIG. 1 is a top plan view of a portion of a transfer boom having spreader bars mounted upon the boom by mounting devices embodying the present invention, two different forms of mounting devices being shown in FIG. 1.

In FIG. 1 there is shown a portion of an elongate rigid boom designated generally 20 which typically is mounted upon a reciprocable shuttle carriage or some other transfer device, not shown, for movement from one work station of a production line to another. In FIG. 1, two venturi vacuum cup assemblies VI and V2 are supported from boom 20 by spreader bars 22 and 24 respectively. The present invention is directed to mounting devices designated generally 26 and 28 which ar employed to mount the spreader bars 22 and 24 upon boom 20 and to clamp the spreader bar at a selected angularly adjusted relationship to the boom.

Boom assemblies of this type are frequently employed to transfer relatively large sheet metal panels, such as automotive body panels, of irregular shape from one work station to another. To couple the panel to the boom assembly, several vacuum cup assemblies such as V1, V2 are employed to grip the panel at several separated points on the panel to stably support the panel while it is being transported. When the line is changed over from handling one particular type of panel to handle a different panel, a different arrangement of vacuum cups is required, and this change in tooling setup can be accomplished simply by mounting a different set of spreader bars at different locations on the boom.

Figure 2:
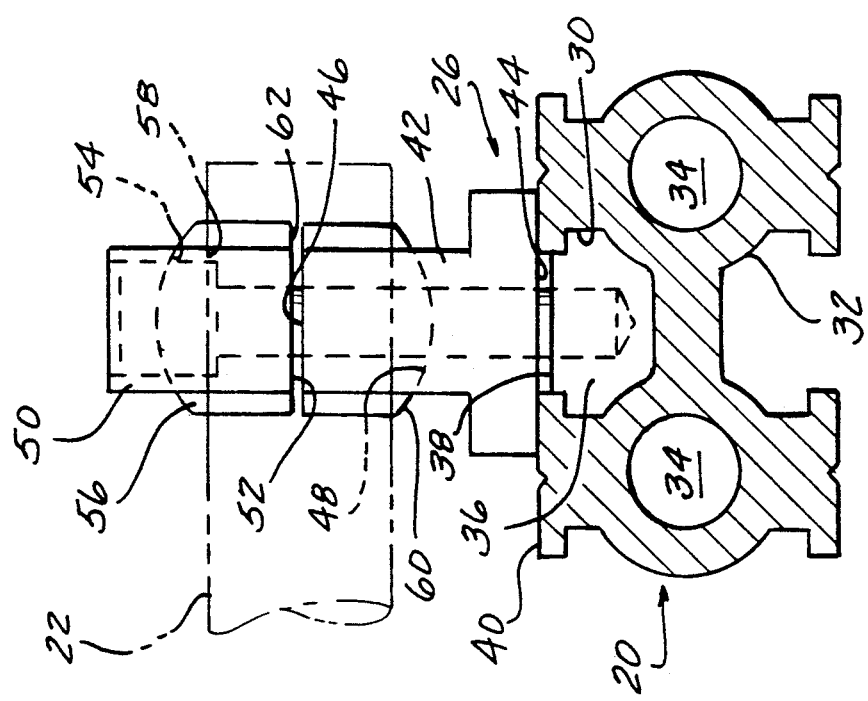
FIG. 2 is an end view of one form of mounting device taken on the section line 2—2 of FIG. 1, with certain parts shown in section or broken line.
Figure 4:
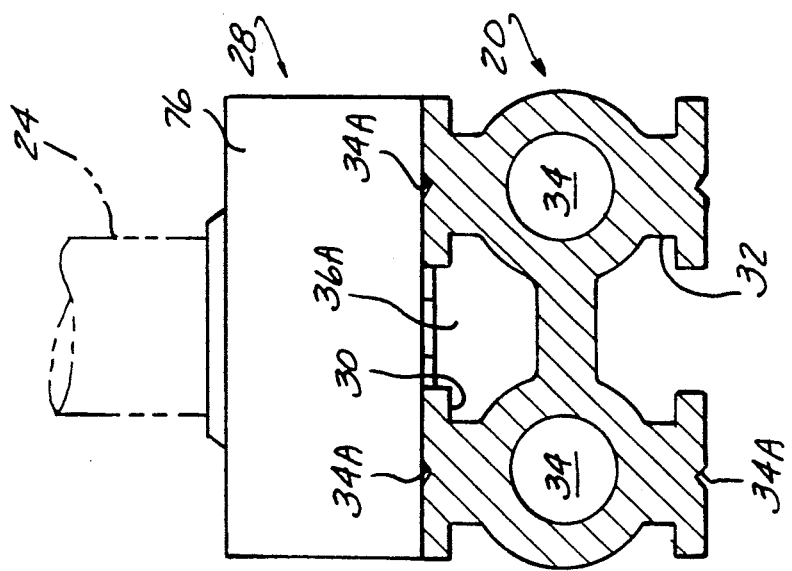
FIG. 4 is an end view of a second form of mounting device taken on section line 4—4 of FIG. 1, with certain parts being shown in section or broken line.

The boom 20 shown in the drawings is the subject matter of my parent application Ser. No. 07/639,831 referred to above, and preferably takes the form of an aluminum extrusion whose cross sectional configuration is best shown in FIGS. 2 and 4. For purposes of the present application, the boom 20 is formed with an undercut T slot 30 extending the entire length of the top side of boom 20 as viewed in the drawings. A similar slot 32 is formed in the bottom side of boom 20 in the particular form of boom shown in the drawings, and boom 20 is formed with a pair of passages 34 (FIGS. 2 and 4) which likewise extend the entire length of the boom.

Figure 3:
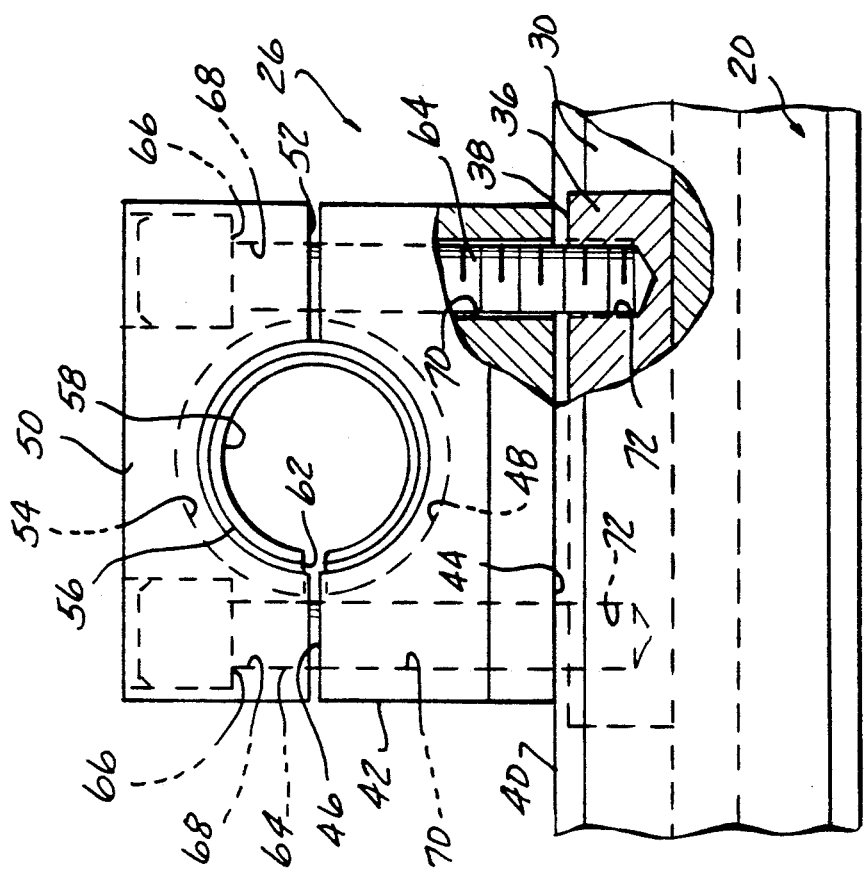
FIG. 3 is a side elevational view of the structure shown in FIG. 2, with certain parts broken away or shown in section.

Details of the spreader bar mounting device 26 are best seen in FIGS. 2 and 3 of the drawings. The mounting device 26 includes an elongate retainer member 36 of a transverse cross sectional configuration complimentary to that of the T slot 30, retainer member 36 being slidably received within slot 30 with the top surface 38 of retainer 36 being located slightly below the top surface 40 of boom 20.

A base 42 has a flat bottom surface 44 in face to face engagement with the top surface 40 of boom 20, the base bottom surface 44 engaging boom top surface 40 at opposite sides of slot 30. The upper side surface 46 of base 42 is formed with a doubly concave recess 48 which forms half of the socket portion of what will be generally referred to as a ball and socket joint.

Figure 7:
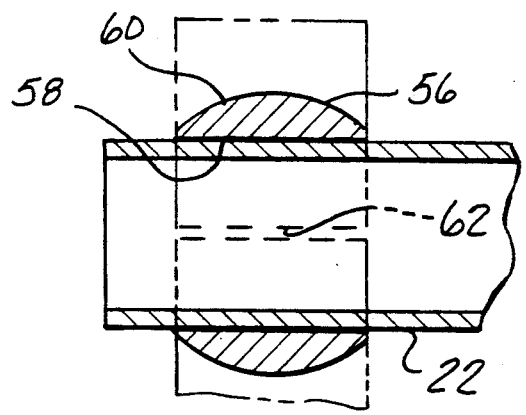
FIG. 7 is a cross sectional view of one form of coupling element for coupling a spreader bar to either form of mounting device shown in FIG. 1.

A clamp member 50 has a flat bottom surface 52 located in opposed facing relationship to the top surface 46 of base 42. The bottom surface 52 of clamp member 50 is formed with a doubly concaved recess 54 of the same shape and dimensions as the recess 48 in base 42 and constituting the other half of the joint socket, the two recesses 48 and 54, when in the assembled relationship shown in FIGS. 2 and 3, cooperatively define a socket for receiving a ring shaped member 56 which constitutes the ball portion of the ball and socket joint. The ring member 56 is formed with a central through bore 58. The radially outer surface 60 of ring 56 is a spherical surface lying at a fixed radial distance from a center located on the axis of bore 58 midway between the opposite ends of the bore. The surface 60 is complementary to the concave surfaces of recesses 48 and 54. A slot 62 extends axially of ring 56 from end to end to constitute the ring as a split ring which can be radially compressed by an amount determined by the width of slot 62. As best seen in FIG. 7, the spreader bars typically are of hollow tubular construction, the diameter of the bore 58 of the ring may be made slightly undersize with respect to the outer diameter of bar 22 to establish a resiliently maintained friction fit between the ring and bar.

Ring 56 is clamped between clamp member 50 and base 42. Base 42 and retainer 36 are clamped to boom 20 by a pair of clamping screws 64 having heads seated in a counterbore 66 (FIG. 3) in clamp member 50 and extending downwardly freely through bores 68 and 70 in clamp member 50 and base 42, the lower end of each screw 64 passing downwardly through slot 30 to be threadably received in a tapped bore 72 in retainer 36.

It is believed apparent that when spreader bar 22 is received within ring member 56 and the ring member in turn is loosely received within the recesses 48, 54 of base 42 and clamp member 50, with screws 64 loose, spreader bar 22 can be angularly adjusted about any or all of three mutually perpendicular axes relative to the base and clamp. The mounting device may be longitudinally located along boom 20 with the clamping screws loosened simply by sliding the base and retainer along slot 30. Tightening of the clamping screws 64 simultaneously clamps the mounting device 26 at a selected position longitudinally of boom 20 and clamps the ring 56 and spreader bar 22 at a selected position of angular adjustment relative to the mounting device.

Figure 6:
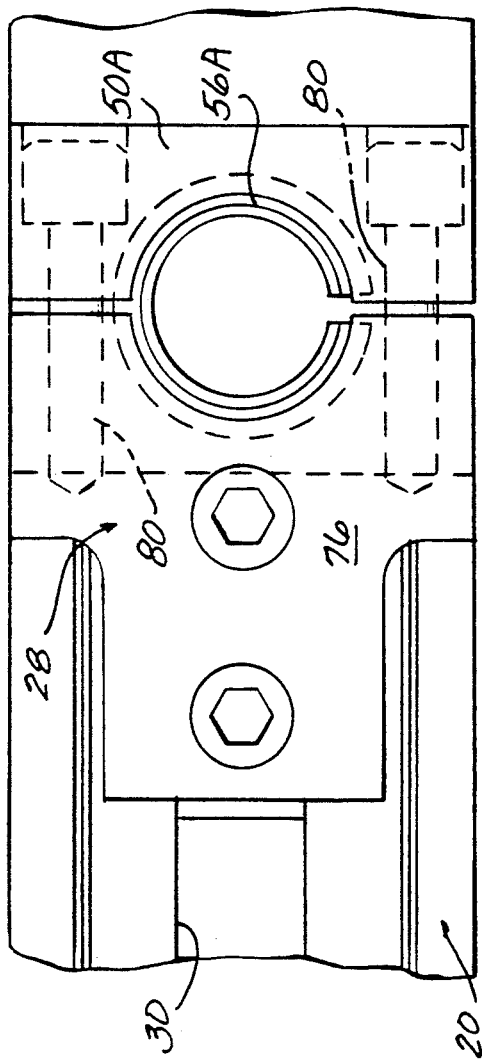
FIG. 6 is a top plan view of the mounting device of FIGS. 4 and 5.
Figure 5:
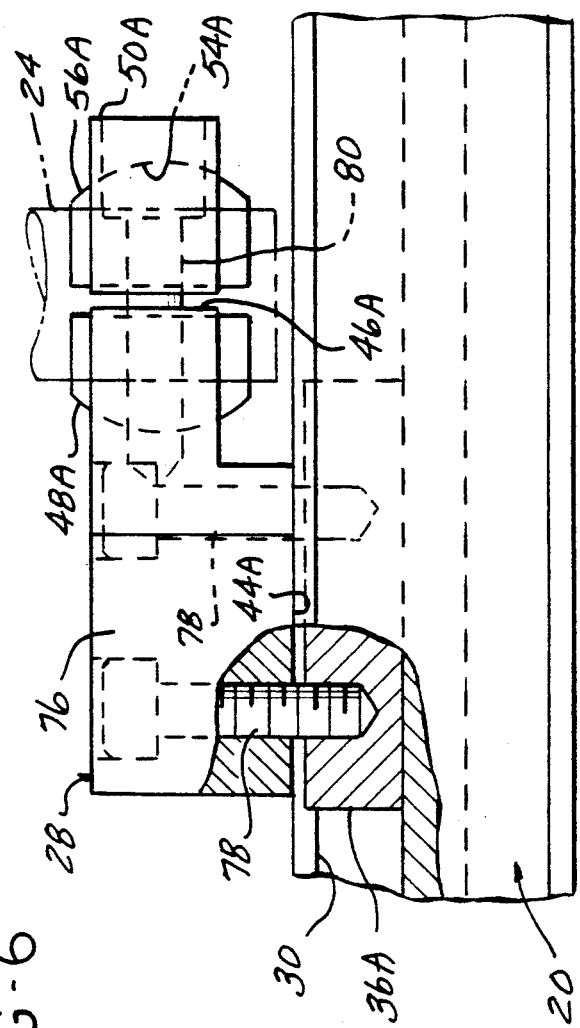
FIG. 5 is a side elevational view of the device of FIG. 4, with certain parts broken away and shown in section.

A second form of mounting device 28 is shown in FIGS. 4–6. The mounting device 28 includes a retainer 36A of the same configuration as the retainer 36 of the mounting device of FIGS. 2 and 3. The device 28 also employs a clamp member 50A of the same construction as the clamp member 50 of the mounting device of FIGS. 2 and 3. However, the base 76 of mounting device 28 differs substantially from the base 42 of the mounting device 26. The base 76 of mounting device 28 is formed at one side with a concave recess 48A which may be of the same configuration and dimensions as the recess 48 of the base 42 of FIGS. 2 and 3, and the clamp member 50A is formed with a doubly concave recess 54A which is of the same shape and dimensions as the recess 54 of the clamp member 50 of mounting device 26. As in the previous case, recesses 48A and 54A define the socket of a ball and socket joint whose ball is a coupling element in the form of a ring 56A, of a construction identical to the ring 56 of device 26, which is received in recesses 48A and 54A between the clamp member 50A and base 76 of device 28.

In the device of FIGS. 4–6, the base 76 is clamped to boom 20 by screws 78 threadably received in retainer member 36A as best seen in FIG. 5. A second pair of screws 80 (FIGS. 5 and 6) are employed to clamp ring 56A between clamp member 50A and base 76.

In the particular form of base 76 shown in FIGS. 4–6, clamp member 50A is located in opposed relationship to a surface 46A of base 76 which is perpendicular to that surface 44A of base 76 engaged with the side surface of boom 20. Where the side surfaces of the base, such as the surfaces 44 and 46 of the embodiment of FIGS. 2 and 3, lie in parallel planes, it is a simple matter to employ a single set of clamping screws to clamp the mounting device in position on the boom and at the same time clamp the spreader bar at the desired angle to the boom. This arrangement in some cases will complicate the initial setup of the device since both the longitudinal position of the mounting device on the boom and the angular position of the spreader bar must be held and set simultaneously.

Where separate clamping systems are employed to respectively establish the longitudinal position of the mounting device on the boom and the angular position of the spreader bar, as in the embodiment of FIGS. 4–6, the tooling setup may be simplified. Also, the employment of independent clamping arrangements as in FIGS. 4–6 provides substantially increased flexibility in orienting the ring engaging recesses of the base and clamp member. In the form shown in FIGS. 4–6, the clamp interface lies in a general vertical plane perpendicular to the longitudinal axis of boom 20, however, it is believed apparent that this interface may lie in substantially any general plane.

Figure 8:
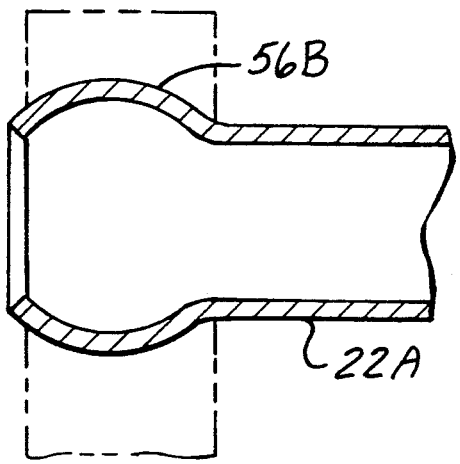
FIG. 8 shows a modified form of coupling a spreader arm to either form of mounting device.

In FIG. 8, a modified form of coupling is shown in which a spherical enlargement 56B is integrally formed at one end of a spreader bar 22A to perform the function of the ring 56 of the FIG. 7 arrangement.

Boom 20 may be formed with V shaped grooves 34A (shown only in FIGS. 1, 4 and 6) located in the top and bottom surfaces of boom 20 in vertical alignment with the axes of the internal passages 34. Grooves 34A accurately transversely locate a drill bit utilized to tap into passages 34 to conduct air between passage 34 and a pneumatically actuated work gripper—note air hoses H in FIG. 1.

While various embodiments of the invention has been described in detail, it will be apparent to those skilled in the art the disclosed embodiments may be modified. Therefore, the foregoing description is to be considered exemplary rather than limiting, and the true scope of the invention is that defined in the following claims.

What is claimed is:

1. In a boom assembly including an elongate rigid boom having an undercut T slot extending longitudinally along one side of said boom, a rigid spreader bar, and mounting means for mounting said bar on said boom to project laterally from said boom at selected location longitudinally of said boom;

the improvement wherein said mounting means comprises a retainer member slidably received in said T slot, a base member having first and second side surfaces, said second side surface being engaged in opposed face to face relationship with said one side of said boom at opposite sides of said slot, a clamp member having a first side surface located in opposed facing relationship with said first side surface of said base member, said first side surfaces of said base and clamp embers each having like doubly concave recesses therein, coiling mean sat said one end of said spreader bar defining a convex spherical surface adapted to be received within said concave recesses in said base and clamp members for at least limited angular adjustment about any of three mutually perpendicular axes, and clamp means for clamping said base to said one side of said boom and for clamping said coupling means against angular movement relative to said base and clamp member.

2. The invention defined in claim 1 wherein said coupling means comprises an annular ring having a central bore therethrough and an exterior surface lying at a fixed radial distance from a center located on the axis of said bore midway between the ends thereof.

3. The invention defined in claim 2 wherein said ring has an axial extending slot accommodating radial expansion and contraction of said ring.

4. The invention defined in claim 1 wherein said spreader bar comprises a hollow tubular member having a spherical enlargement at one end thereof defining said coupling means.

5. The invention defined in claim 1 wherein said clamp means comprises first clamp means for clamping said retainer and base to said boom, and second clamp means for clamping said coupling means between said base and clamp member.

6. The invention defined in claim 5 wherein said first and second side surfaces of said base member are flat surfaces respectively lying in intersecting general planes.

7. The invention defined in claim 1 wherein said first and second surfaces of said base member are flat parallel surfaces located at opposite sides of said base member, and said clamp means couples said clamp member to said retainer.

8. The invention defined in claim 7 wherein said clamp means comprises a screw having a head seated in said clamp member and a threaded shank passing freely through aligned bores in said clamp member and said base member and threadably received in said retainer member.

9. The invention defined in claim 1 wherein said boom is of uniform transverse cross section and has a longitudinal internal passage extending along a passage axis parallel to the general plane of said one side of said boom, means defining a V shaped groove in said one side of said boom extending longitudinally of said boom in an alignment with said internal passage wherein said groove is bisected by a plane normal to said one side of said boom and containing said passage axis.

10. The invention defined in claim 9 wherein said boom includes a pair of said longitudinal passages each having one of said V shaped grooves aligned therewith, said passages and said grooves being symmetrically located at opposite sides of said T slot in said boom.

11. In a boom assembly including an elongate rigid boom, a rigid separator bar, and mounting means for mounting said spreader bar on said rigid boom to project laterally at a selected location longitudinally from said rigid boom, the improvement wherein said mounting means comprises:

a retainer member slidably received within said rigid boom;

a mounting member adapted to engage an external surface of said rigid boom in opposed relationship to said retainer member;

clamp means for clamping said mounting member to said retainer member with a portion of said rigid boom disposed therebetween, said clamp means allowing adjustment in at least two planes of movement, a first plane of movement longitudinally along the length of said rigid boom and angular movement in a second plane normal to the longitudinal axis of said rigid boom, and said clap means securing said rigid mounting member and said retainer member against longitudinal and angular movement relative to said rigid boom;

said elongate rigid boom having a slot extending longitudinally along one side of said rigid boom;

said retainer member slidably received in said slot of said rigid boom;

said mounting member having a first surface straddling said slot in said rigid boom, said mounting member further having an annular, doubly-concave recess formed therein, said mounting member including a clamp member having a portion of said doubly-concave recess therein; and coupling means connectable to said spreader bar confining a convex spherical surface adapted to be received within said doubly-concave recess in said mounting member and clamp member for allowing at least limited angular adjustment about any of three mutually perpendicular axes.

12. The improvement of claim 11 wherein said coupling means comprises:

an annular ring having a central bore therethrough and an exterior surface lying at a fixed radial distance from a center located on the axis of said bore midway between the ends thereof.

13. The improvement of claim 12 wherein said ring has an axially extending slot accommodating radial expansion and contraction of said ring.

14. The improvement of claim 11 wherein said spreader bar comprises a hollow tubular member having a spherical enlargement at one end thereof defining said coupling means.

15. The improvement of claim 11 wherein said clamp means comprises first clamp means for clamping said retainer member and mounting member to said boom, and second clamp means for clamping said coupling means between said mounting member and clamp member.

16. The improvement of claim 11 wherein said clamp means comprises a screw having a head seated in said clamp member and a threaded shank passing freely through aligned bores in said clamp member and said mounting member, said screw threadably received in said retainer member.

17. The improvement of claim 11 wherein said rigid boom comprises an extruded member having a uniform transverse cross-section and a longitudinal internal passage extending along a passage axis parallel to a general plane of one side of said boom and means defining a V-shaped groove in said one side of said boom extending longitudinally of said boom in alignment with said internal passage wherein said groove is bisected by a plane normal to said one side of said boom and containing said passage axis.

18. The improvement of claim 17 wherein said boom further comprises a pair of longitudinal passages, each having one of said V-shaped grooves aligned therewith, said passages and said grooves being symmetrically located on opposite sides of a T-shaped slot in said boom.

* * * * *